UNITED STATES PATENT OFFICE.

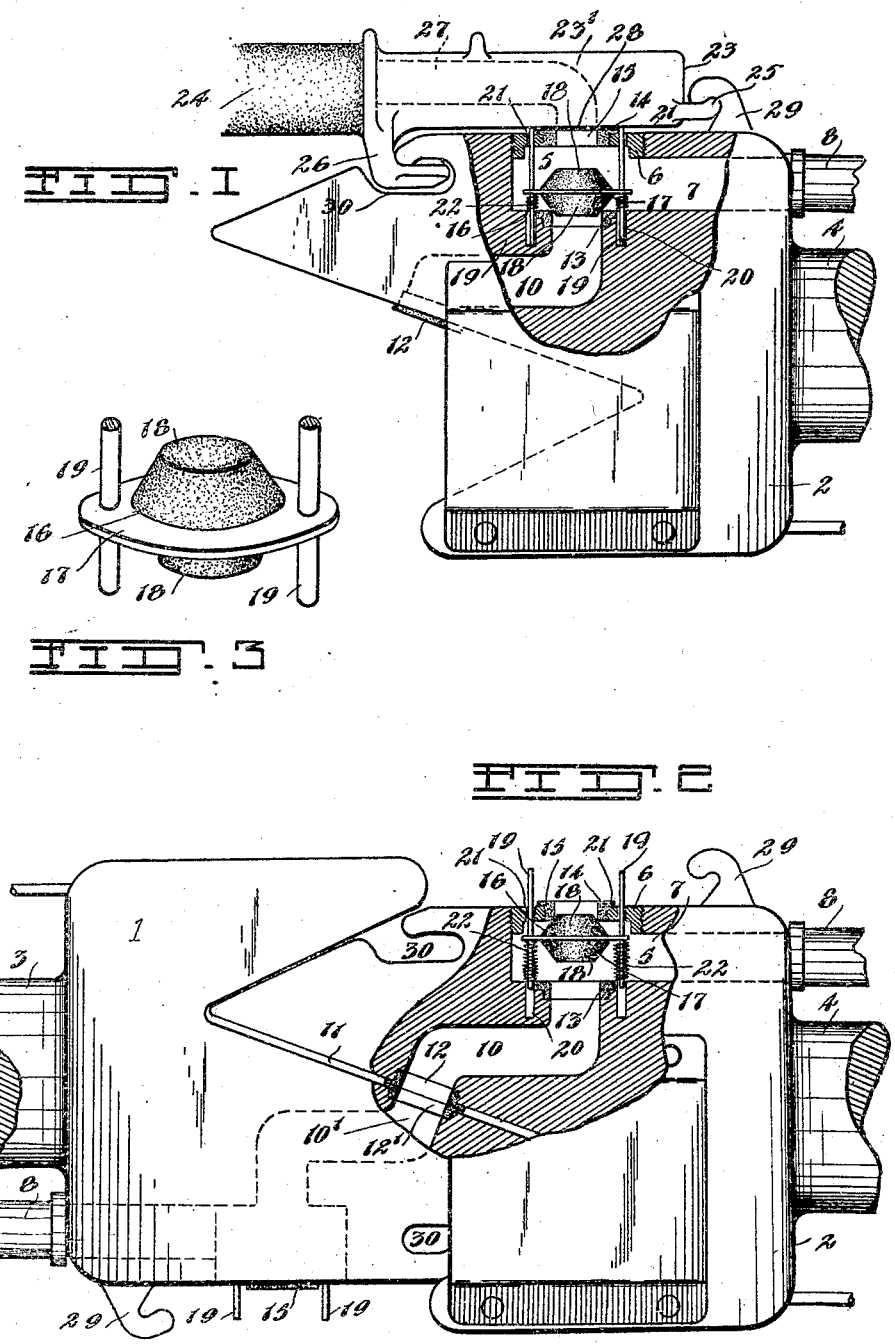

PETER AVILA SENECAL, OF WINNIPEG, MANITOBA, CANADA.

CAR PIPE-LINE COUPLING.

937,874.  Specification of Letters Patent.  Patented Oct. 26, 1909.

Application filed February 13, 1909. Serial No. 477,818.

*To all whom it may concern:*

Be it known that I, PETER AVILA SENECAL, of the city of Winnipeg, in the Province of Manitoba, Canada, have invented certain new and useful Improvements in Car Pipe-Line Couplers, of which the following is a specification.

My invention relates to a coupler for effectually interconnecting the train line, the signal line, and the steam heating line in a train of cars, and the object of the invention is to improve the construction of coupler, on which I have obtained Canadian Patent No. 114564, dated the 13th day of October, 1908, so that it is always possible to make a pipe connection whether the adjoining cars are both supplied with my coupler, or one with my coupler and one with the form of coupler already in use.

In introducing the coupler, as protected by the above mentioned patent, there is the objectionable feature that it is only possible to connect the pipe lines of two cars which are fitted with it, and there is the possibility that a car equipped with my coupler might require to be connected with one having the older form of connection or that now generally in use.

The object of the present invention is to overcome this objection in a simple and inexpensive manner which will allow a connection to be made quickly and positively.

My invention consists essentially in a two faced spring pressed valve introduced within the ducts or ports appearing in the former jaw-shaped heads, means for connecting the form of coupler at present generally in use to the head, the opening in such latter coupler registering with an opening in the head extending from the valve chamber, and means whereby the operation of connecting said coupler to the head seats the valve in one of its alternative positions, the parts being arranged and constructed as hereinafter more particularly described.

Figure 1 is a plan view of one of my couplers showing the older form of coupler attached thereto, a part of the head being broken away showing the valve seated in one of its alternative positions. Fig. 2 represents a plan view of two of my improved couplers or jaw-shaped heads connected, part being broken away to expose the valve and the ducts, the valve being shown in the alternative position to that in Fig. 1. Fig. 3 is an enlarged detailed perspective view of the valve and rods.

In the drawings like characters of reference indicate corresponding parts in each figure.

1 and 2 are two complementary jaw-shaped heads of precisely the same form as those already described in my previous application, save for the improvements or additions which have been made, and are later explained.

3 and 4 are circular shafts passing back from the heads of which they form a part.

5 is a chamber cut or recessed in the side of the head, such chamber being closed by a cap screw 6 which screws in from the exterior.

7 is a duct entering the chamber and passing to the rear of the head where it opens into the pipe line 8 forming a continuous passageway therewith. 10 is a second duct leading centrally from the bottom of the chamber 5 to the face 11 of the jaw-shaped head.

12 and 13 are rubber gaskets of the ordinary form screwing into the head at the ends of the opening or duct 10. The gasket 12 is designed to make a closed joint with the gasket 12′ when the couplers 1 and 2 are brought together, it being understood that the construction of both the couplers is the same. The air ducts 10 and 10′ form a continuous air passage way.

The cap screw 6 is provided with a central opening 14 directly opposing the duct 10 where it enters the chamber. The opening is provided with a rubber gasket 15 which as also the gasket 13, forms a seat for the valve, as later explained.

16 is a valve which is formed from a central plate 17 having secured to its opposing faces conically shaped rubber members 18 which are adapted to seat in the rubber gaskets 13 and 15, respectively.

19 are rods immovably secured to the plate 17 and have their lower ends entering openings 20 formed in the head, and their upper ends passing into openings 21 formed in the cap screw 6.

22 are springs encircling the rods and bearing at their lower ends against the bottom of the chamber 5 and at their upper ends against the under face of the plate 17.

23 is the form of air coupler now generally in use which consists in a circular head 23' having an extending shank to which is secured the pipe line 24. The head 23' is provided with an extending lip 25 and an arm or jaw 26, the arm being of such a shape that it may receive between its overhanging end and the body of the head a lip corresponding to that of 25 on a complementary coupling similar to that of 23. The head 23' has also a duct 27 passing centrally therethrough which forms a continuous passage-way with the pipe 24 and opens to the exterior at the under face of the head where it is provided with a rubber gasket 28. 29 is a lug formed on the jaw-shaped head and designed to receive the lip 25 of the coupler 23. 30 is a recess in the automatic or jaw shaped coupling head 2 designed to receive the arm 26. These latter parts are so designed that the coupler 23 can be quickly and removably secured to the jaw-shaped head, the passage 27 communicating with the valve chamber 5.

I have not given a detailed description of the ordinary form of coupler 23 as this is in general use and consequently well known. Nor have I given a detailed description of the form of the lug 29 and recess 30, as the form of these will be that which will receive the lip and arm of the coupler 23 to best advantage.

The operation of the device is as now described, it being noted that the valve is normally seated on the gasket 15, due to the action of the springs. When two of my improved heads are brought together the valves are in the position as shown in Fig. 2, and the air passing through the pipe lines 8 passes through the openings 7 and 10 10', the valve preventing any escape through the opening in the gasket 15. With two cars, one having my form of coupler or head and the other the ordinary form of coupler, the pipe lines are connected by applying the old form of coupler to my coupler, as shown in Fig. 1. When the parts are thus connected the extending ends of the rods 19 are forced downwardly by the face of the head 23' and the valve is seated on the gasket 13 thereby effectually closing the port 10. A closed joint is formed between the gasket in the head 23 and the gasket 15. The air in the pipe lines passes then through the passage 27 directly through the chamber and over the valve to the duct 7.

What I claim as my invention is:

1. In a car pipe line coupler, the combination with a head having a main duct passing therethrough, and a branch duct leading from the main duct, of a reciprocatable valve located at the junction of the ducts and designed to control the passage of air through the main or through the branch duct in its alternative positions, as and for the purpose specified.

2. In a car pipe line coupler, the combination with a head having a valve chamber therein, a duct leading to the valve chamber, and two openings passing from the valve chamber to the exterior of the head, of a reciprocatable valve operating within the chamber and designed to close either of the openings in its alternative positions, as and for the purpose specified.

3. In a car pipe line coupler, the combination with a head having a valve chamber therein, a duct entering the valve chamber for the delivery of air, a duct leading from the valve chamber, and an opening opposite the latter duct, both the opening and the duct passing to the exterior of the head, of a valve operating within the valve chamber and adapted to close either the opening or the duct opposing the opening in its alternative positions; means whereby the valve is held normally closing the opening; and means whereby the valve can be depressed from the exterior of the head to close the duct, as and for the purpose specified.

4. In a car pipe line coupler, the combination with a jaw-shaped head having a valve chamber therein closed by a cap screw, said cap screw having an opening therein passing to the exterior of the head, a duct entering the chamber and a duct leading from the chamber directly opposite the opening in the cap screw, of a spring-pressed valve normally closing the opening thereby allowing of a continuous air passage through the ducts; and means adapted to be operated from the exterior of the head whereby the valve can be forced to its alternative position to close the opposing duct and form a continuous air passage between the unclosed duct and the opening, as and for the purpose specified.

5. In a car pipe line coupler, the combination with a jaw-shaped head having a valve chamber therein closed by a cap screw, said cap screw having an opening therein passing to the exterior of the head, there being a duct entering the chamber and a duct leading from the chamber directly opposite the opening in the cap screw, of a valve formed from a plate having conically shaped members extending from its opposing faces and being provided with extending rods secured firmly to the plate, said rods being received at their lower ends within openings formed in the head and having their upper ends passing through openings provided in the cap screw and springs encircling the rod and bearing at their lower ends on the bottom of the chamber, and at their upper ends against the under face of the plate, as and for the purpose specified.

6. In a car pipe line coupler, the combination with a jaw-shaped head having an air duct therein and an opening passing from the air duct to the side of the head, and a coupler formed by a circular head having a central passageway therein and provided with an extending lip and arm, of means consisting in a lug extending from the jaw-shaped head and adapted to receive the lip; and a recess formed in the head adapted to receive the arm whereby the circular and the jaw-shaped head can be secured together, as and for the purpose specified.

Signed at Winnipeg, in the Province of Manitoba, this 19th day of January 1909.

PETER AVILA SENECAL.

In the presence of—
G. S. ROXBURGH,
M. A. SOMERVILLE.